US011448358B2

(12) United States Patent
Dow et al.

(10) Patent No.: US 11,448,358 B2
(45) Date of Patent: Sep. 20, 2022

(54) HEAVY-DUTY JACK STAND

(71) Applicant: STAND TECHNOLOGIES PTY LTD, Brisbane (AU)

(72) Inventors: Matthew Dow, Brisbane (AU); Brian Macdonald, Brisbane (AU)

(73) Assignee: STAND TECHNOLOGIES PTY LTD, Brisbane (AU)

( * ) Notice: Subject to any disclaimer, the term of this patent is extended or adjusted under 35 U.S.C. 154(b) by 0 days.

(21) Appl. No.: 17/259,734

(22) PCT Filed: Jul. 30, 2019

(86) PCT No.: PCT/AU2019/050796
§ 371 (c)(1),
(2) Date: Jan. 12, 2021

(87) PCT Pub. No.: WO2020/024005
PCT Pub. Date: Feb. 6, 2020

(65) Prior Publication Data
US 2021/0215291 A1   Jul. 15, 2021

(30) Foreign Application Priority Data
Jul. 31, 2018   (AU) ............................... 2018902780

(51) Int. Cl.
*B25H 1/00*   (2006.01)
*F16M 11/22*   (2006.01)
*G01G 19/02*   (2006.01)

(52) U.S. Cl.
CPC ........... *F16M 11/22* (2013.01); *B25H 1/0007* (2013.01); *G01G 19/021* (2013.01); *F16M 2200/08* (2013.01)

(58) Field of Classification Search
USPC .............. 254/133 R, 11, 418, 419, 423, 427, 254/DIG. 1; 248/346.01, 346.05, 346.5
See application file for complete search history.

(56) References Cited

U.S. PATENT DOCUMENTS 3,318,057 A  *  5/1967  Norsworthy ...... E04F 15/02482
52/126.6
3,970,278 A  7/1976  Studer
(Continued)

FOREIGN PATENT DOCUMENTS

CN  108285104 A  7/2018
CN  207583402 U  7/2018
(Continued)

OTHER PUBLICATIONS

Written Opinion of the International Searching Authority for corresponding International Application No. PCT/AU2019/050796, dated Sep. 26, 2019, 10 pages.
(Continued)

*Primary Examiner* — Alfred J Wujciak
(74) *Attorney, Agent, or Firm* — Tucker Ellis LLP

(57) ABSTRACT

Provided is a jack stand that includes a base and a post for extending from the base. A top is provided for topping the post and engaging with a load. The top includes a load spreader for spreading the weight of the load to the post. Advantageously, the spreader spreads the weight of the load to the post thereby resulting in a more heavy duty jack-stand, rated for significantly higher loads, than prior jack stands which instead can fracture under heavy unbalanced loads locally travelling along one side when the loading is not evenly spread.

18 Claims, 3 Drawing Sheets

(56) References Cited

U.S. PATENT DOCUMENTS

| | | | | |
|---|---|---|---|---|
| 4,085,557 | A | * | 4/1978 | Tharp ............... E04F 15/02441 |
| | | | | 52/126.6 |
| 4,548,418 | A | | 10/1985 | Wendorff |
| 4,870,789 | A | * | 10/1989 | Clark ...................... E02D 35/00 |
| | | | | 52/126.6 |
| 4,901,490 | A | * | 2/1990 | Zinniel ............. E04F 15/02405 |
| | | | | 248/346.5 |
| 5,462,257 | A | * | 10/1995 | Trowbridge .............. B66F 5/00 |
| | | | | 254/8 B |
| 6,375,160 | B1 | * | 4/2002 | Hung ........................ B66F 5/00 |
| | | | | 254/133 R |
| 8,365,475 | B2 | * | 2/2013 | Zlatar ............... E04F 15/02452 |
| | | | | 52/126.6 |
| 9,022,355 | B1 | * | 5/2015 | Pigeon ...................... B66F 5/04 |
| | | | | 254/2 B |
| 11,045,934 | B1 | * | 6/2021 | Hunter ................. B25B 27/064 |
| 2017/0182604 | A1 | | 6/2017 | Velez |
| 2019/0127192 | A1 | * | 5/2019 | Macdonald ............... B66F 3/08 |

FOREIGN PATENT DOCUMENTS

| | | |
|---|---|---|
| GB | 854978 A | 11/1960 |
| JP | S62-269897 A | 11/1987 |
| WO | 2017181229 A1 | 10/2017 |

OTHER PUBLICATIONS

Supplementary European Search Report of corresponding EP Application No. 19844595.9, dated Apr. 7, 2022, 7 pages.

* cited by examiner

HEAVY-DUTY JACK STAND

RELATED APPLICATION DATA

This application is a national phase application of International Application No. PCT/AU2019/050796, filed Jul. 30, 2019, which claims priority to AU 2018902780, filed Jul. 31, 2018, which are hereby incorporated herein by reference.

TECHNICAL FIELD

The present invention generally relates to heavy-duty jack stand. The present invention has particular, although not excusive application to heavy-duty industrial jack stands for supporting vehicles, equipment, machinery and other like heavy loads (beyond 30 tonne) in the earthmoving, trucking, mining, construction, engineering and marine fields.

BACKGROUND

The reference to any prior art in this specification is not, and should not be taken as an acknowledgement or any form of suggestion that the prior art forms part of the common general knowledge.

Jack stands are commonly used to safely support heavy mining trucks that have been raised by a jack, or other means, for maintenance.

Known jack stands are formed from metal parts such as steel to sustain the weight of the trucks. In turn, the jack stands themselves are very heavy (in some cases up to 200 kg+) which makes them cumbersome to move around. In practice, multiple persons are required to safely lift and position the jack stands in place which undesirably presents an injury risk. Alternatively, forklifts, loaders or specific placement tooling are used to lift and position the jack stands which is safer, but often less convenient, more expensive, slower and less productive.

Further, maneuvering these jack stands precisely into position is difficult with machinery, and so is almost always done manually at great risk of personal injury.

PCT/AU2017/050349 discloses a light weight jack stand that can be manually moved in a safe and convenient manner, but which can still safely support payloads of up to 30 tonne.

The preferred embodiment provides a heavy-duty jack stand able to support loads over 30 tonne.

SUMMARY OF THE INVENTION

According to one aspect of the present invention, there is provided a jack stand including:
 a base;
 a post for extending from the base, and
 a top for topping the post and engaging with a load, the top including a load spreader for spreading the weight of the load to the post.

Advantageously, the spreader spreads the weight of the load to the post thereby resulting in a more heavy duty jack-stand, rated for significantly higher loads, than the jack stands of PCT/AU2017/050349. The jack stands of PCT/AU2017/050349 instead can fracture under heavy unbalanced loads locally travelling along one side when the loading is not evenly spread.

The top may further include a receptacle for receiving the post and supporting the load spreader. The receptacle may include a cap for capping the post. The cap may define distributed engagement formations to facilitate engagement with the load spreader.

The load spreader may include spaced apart feet. The feet may include engagement formations for engaging with a cap. Each foot may include a plate. The foot plate may be horizontal. The load spreader may further include a head for engaging with the load. The head may include a plate. The load spreader may further include a body extending between the feet and the head. The body may include one or more plates. The body plates may be upright. The body may be X-shaped.

The jack stand may be rated up to 50 tonne, 75 tonne, 100 tonne, 150 tonne, 200 tonne or 400 tonne. The jackstand may be lightweight, weighing between about 30 kg and 705 kg, being about 50%-70% lighter than conventional stands.

The base may be wider than the post to provide stability and to distribute the weight of the load. The base may define a receptacle for receiving the post. The receptacle may form a complementary fit with the post. The base may include a plate from which the receptacle extends. The base may further include one or more strengthening fillets extending between the receptacle and the plate.

The post and/or parts of the load spreader may include composite material. The composite material may include polymeric resin material and high strength fibres. The fibre material may include glass fibre, carbon fibre, and aramid (Kevlar) fibre or other like high tensile composite re-inforcing fibre material. The composite material may include a matting to align fibers in orientations other than longitudinally along the post to improve compressive strength. The composite material may be formed via a pultrusion process. The composite material may include reinforcing fibres wound around the post to improve compressive strength. The reinforcing fibres may be separately wound in both clock-wise and anticlockwise directions along the post to further improve compressive strength.

The post may be tubular.

The base, top, cap and/or load spreader may include metal material, preferably steel or metal alloy. The jack stand may include a handle fastened to the post.

According to another aspect of the present invention, there is provided a load spreader for a jack stand, the jack stand including a base and a post for extending from the base, the load spreader forming at least part of a top for topping the post and engaging with a load, the load spreader spreading the weight of the load to the post.

According to another aspect of the present invention, there is provided a jack stand including:
 a base;
 a post for extending from the base;
 a top for topping the post and engaging with a load; and
 a sensor for sensing the load.

The jack stand may further include a wireless transmitter for transmitting the sensed load. The transmitter may be a WI-FI or Bluetooth transmitter.

The sensor may include a strain gauge or load cell. Each jack stand may further include an overload alarm for triggering when the sensed load exceeds a predetermined threshold. The alarm may be audible. Each jack stand may further include a display for displaying the sensed load.

According to another aspect of the present invention, there is provided a jack stand monitoring system including:
 a plurality of the jack stands; and
 a monitoring station including a receiver for receiving the sensed loads.

The monitoring station may include an overload alarm for being triggered when a sensed load is indicative of a jack stand being overloaded. The monitoring station may further include a logger for logging the sensed loads over time.

Any of the features described herein can be combined in any combination with any one or more of the other features described herein within the scope of the invention.

BRIEF DESCRIPTION OF THE DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows.

DETAILED DESCRIPTION OF PREFERRED EMBODIMENTS

According to one aspect of the present invention, there is provided a heavy-duty jack stand 100 shown in FIG. 1, rated to support payloads over 30 tonne and up to 400 tonne. The jack stand 100 is also lightweight, typically weighing between about 30 kg and 70 kg depending upon rating, and thereby being about 50%-70% lighter than conventional stands.

Figure 1B:
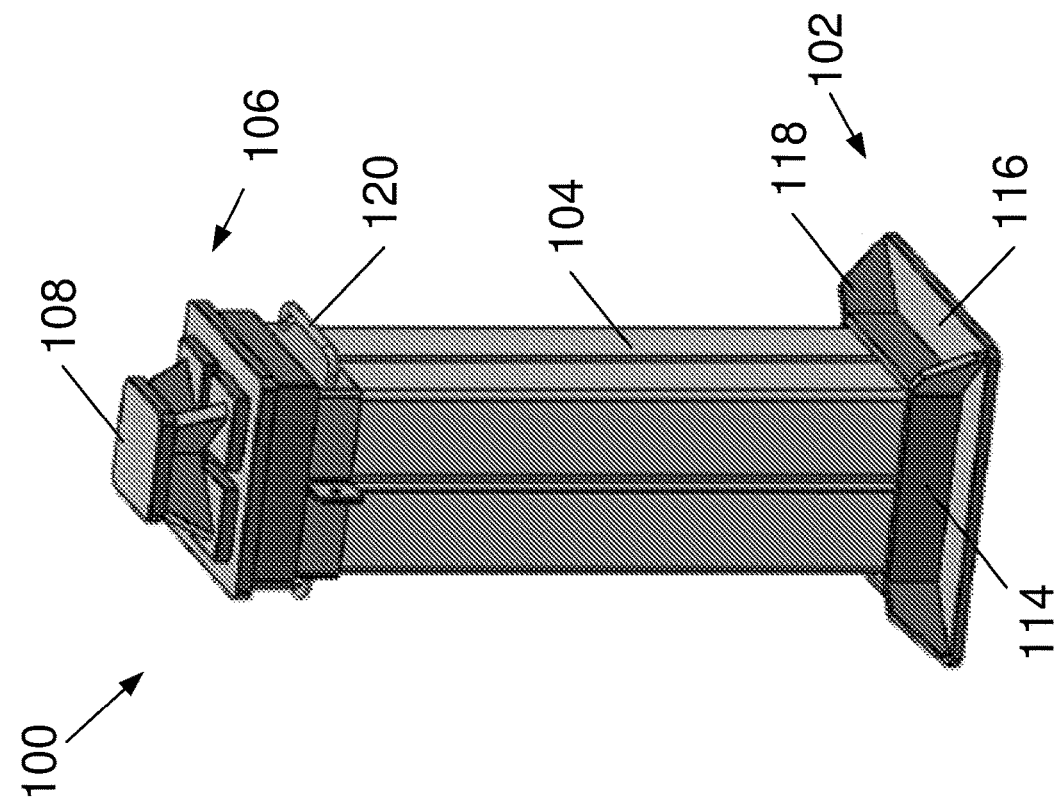
FIG. 1b is a perspective view of the assembled heavy-duty jack stand of FIG. 1a fitted with a load spreader.
Figure 1A:
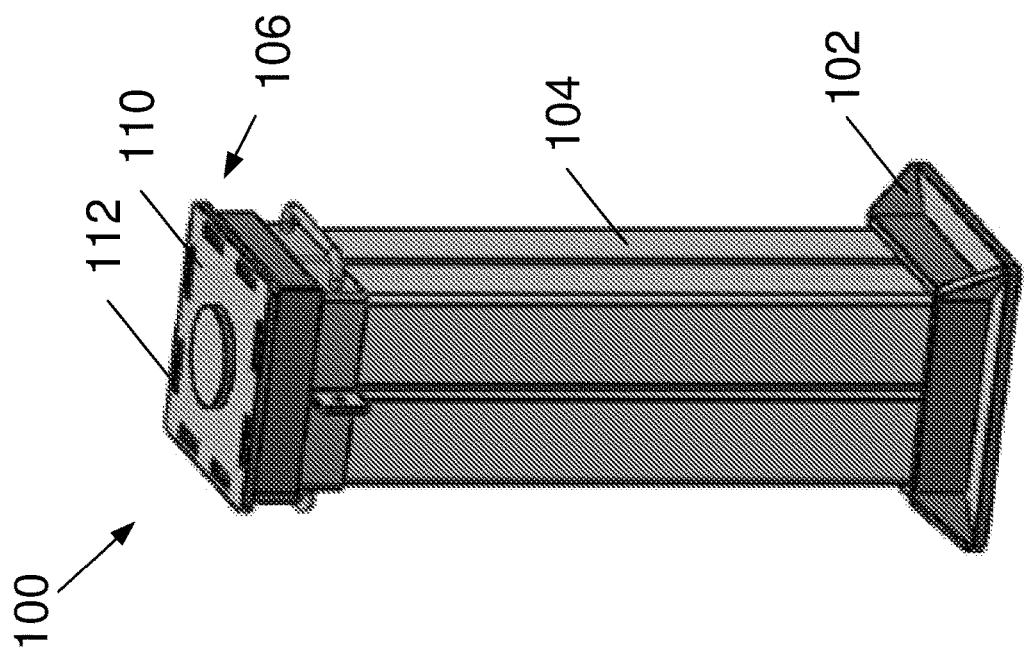
FIG. 1a is a perspective view of a partially assembled heavy-duty jack stand of the present invention prior to fitting a load spreader in accordance with an embodiment of the present invention.
Figure 2A:
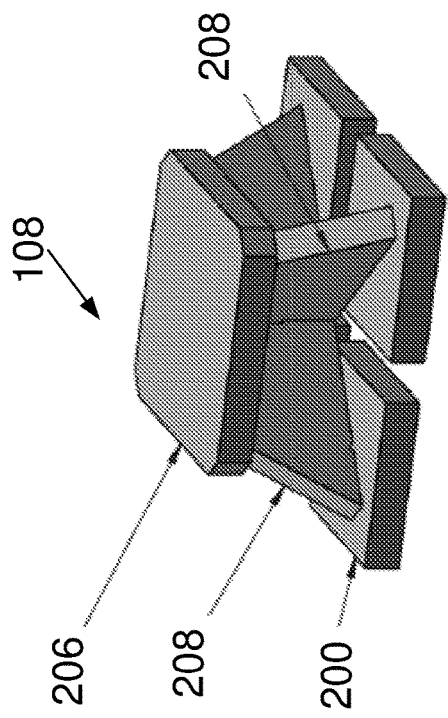
FIG. 2 is an orthographic drawing of the load spreader of FIG. 2 with all dimensions in millimetres.
Figure 2B:
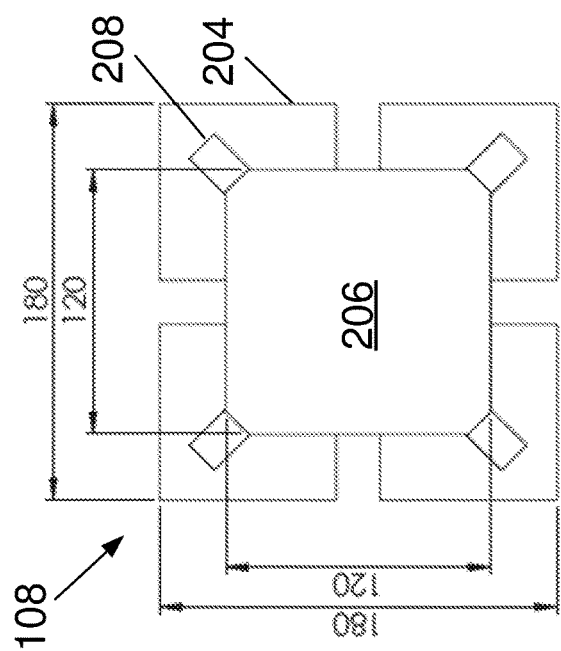
Figure 2C:
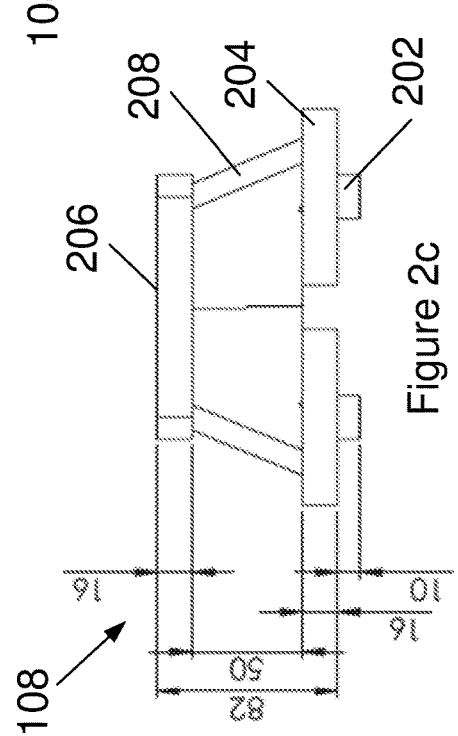
Figure 2D:
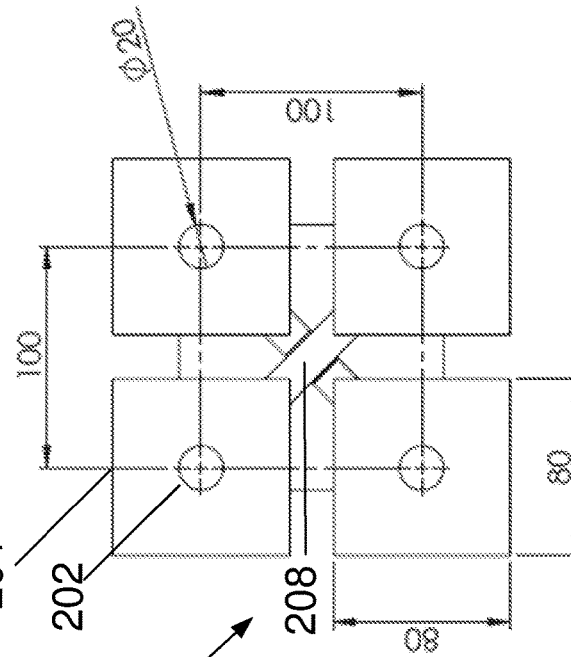

The construction of the jack stand 100 shown in FIG. 1a is similar to that of PCT/AU2017/050349, which is incorporated herein by reference. The jack stand 100 includes a square base 102, and a light-weight composite-material post 104 for extending from the base 102. A top 106 is provided for topping the post 104 and engaging with a load (e.g. truck) supported by the jack stand 100.

As can best be seen in FIG. 1b, the top 106 includes a load spreader 108 for spreading the weight of the load to the post 104. Advantageously, the spreader 108 spreads the weight of the load to the post thereby resulting in a more heavy-duty jack-stand 100, rated for significantly higher loads, than the jack stands of PCT/AU2017/050349. The jack stands of PCT/AU2017/050349 instead can fracture under heavy unbalanced loads locally travelling along one side when the loading is not evenly spread as the load is not centred on the jack stand 100. The jack stand 100 is described in detail below.

Returning to FIG. 1a, the top 106 further includes a receptacle 110 for receiving the post 104 and supporting the load spreader 108. The receptacle 110 is in the form of a cap for capping the post 104 and defines distributed engagement apertures 112 (e.g. slotted formations) to facilitate engagement with the load spreader 108.

Turing to FIG. 1b, the base 102 is wider than the post 104 to distribute weight of the load. The base 102 defines a receptacle 114 for receiving and forming a complementary fit with the post 104. The base 102 includes a plate 116 from which the receptacle 114 extends. The base 102 further includes strengthening fillets 118 extending between the receptacle 114 and the plate 116. The jack stand 100 also includes a handle 120 fastened to the tubular post 104 with a collar.

Turning to FIG. 2, the load spreader 108 includes four spaced apart feet 200 through which the transferred load is evenly spread. The feet 200 include underside engagement protrusions 202 (i.e. formations) for engaging with apertures 112 of the receptacle 110. Each foot 200 also includes a flat horizontal plate 204 for distributing load.

The load spreader 108 further includes a hardened plate head 206 for engaging with the load. The load spreader 108 further includes an X-shaped body 208 extending between the feet 200 and the head 206. The body 208 includes four intersecting upright plates.

The plate-like base 102, receptacle 110, feet 200 and/or head 206 include metal material, preferably steel or metal alloy. In contrast, the upright post 104 and/or body parts 208 of the load spreader 108 include composite material. The composite material includes polymeric resin material and high strength fibres. The fibre material includes glass fibre, carbon fibre, and aramid (Kevlar) fibre or other like high tensile composite re-inforcing fibre material. The composite material also includes a matting to align fibers in orientations other than longitudinally along the post 104 or part 208 to improve compressive strength. The composite material is formed via a pultrusion process. The composite material includes reinforcing fibres wound around the post 104 or part 208 to improve compressive strength. The reinforcing fibres are separately wound in both clock-wise and anti-clockwise directions along the post 104 or part 208 to further improve compressive strength.

A method of manufacturing the post 104 (or part 208) is now briefly described.

The post 104 is formed by pultruding fibres and polymeric material to form the composite material. Pultrusion is a continuous moulding process whereby reinforcing fibres are saturated with a liquid polymer resin and then carefully formed and pulled through a heated die to form a uniform composite part. The manufacturing of parts or components by pultrusion results in straight constant cross section parts of virtually any desired length. The liquid polymer resin can be added to the matrix of structural fibres either before or during forming in the heated die.

Conventional pultrusion processes usually utilise very long reinforcing fibres or braided strands. The reinforcing fibres may include glass fibre, carbon fibre or aramid fibre. The strands are unfurled from coiled rolls (often called rovings) and longitudinally drawn into the preforming, resin impregnation and stationary die system.

Composite materials manufactured by the foregoing pultrusion process have exceptional strength to weight properties in resisting tensile loads but relatively poor strength to weight properties in resisting compressive loads. This is due to the exceptional tensile load bearing material properties of the reinforcing fibres contained within the composite structural matrix.

The forming of the post 104 may involve introducing a woven reinforcing fibre matting in the structural fibre matrix of the resultant post 104 to align fibers of the composite material in orientations other than longitudinally along the elongate post 104 to improve compressive strength. The resulting product has an increased ability to resist compressive forces as compared to products that do not have any form of other than longitudinal fibre orientation, as these fibres are to a greater or lesser degree placed under some form of tensile load. The matting is introduced either within the body of the composite material and/or as a surfacing material, to bind and surround the matrix of structural fibres in the pultrusion process. The surfacing material contributes the structural ability of the product but more importantly ensures a smooth acceptable finish is achieved for the finished part.

The forming of the post 104 further involves winding reinforcing fibres around the composite material to improve compressive strength. The additional reinforcing fibres are axially wound around the composite material along the longitudinal axis of the post 104, and hence around the longitudinal fibres and the woven mat (where this is used), which can significantly increase the ability of the post 104 to resist compressive loads.

The reinforcing fibres may be separately wound in both clock-wise and anticlockwise directions along the post 104 to further improve compressive strength. The windings are laced into the matrix to provide comprehensive tensile load capacity in multiple axes of load.

Winding of the reinforcing fibres into the pultruded fibre matrix can be undertaken with large rotating frames holding the coiled reinforcing fibre rovings. Each roving rotates at a desired rotational speed relative to the longitudinal pultrusion process flow rate, and rotates in the rotational direction to achieve desired axial windings and density of fibre construction. Successive rotating frames can be counter-rotating to achieve the differential orientation of the windings.

Manufacturing pultruded composite products in such a manner exhibits a substantially improved capability to resist compressive loads when compared to conventionally manufactured products that are not manufactured in this manner. Such products can be of any form or shape, including round, square, rectangular or angular, and of differing dimensions.

The manufacturing of pultruded composite products that can achieve an adequate level of compressive load resistance offers significant opportunities for industrial uses, given the product's inherent properties of light weight relative to its load bearing capacity. When compared to existing steel or metal allow products, the incorporation of pultruded composite products as the primary load bearing support element may offer significant advantages. The composite fibre strands go into tension (ie. they 'activate') and in so doing, they provide substantial overall compressive strength to the overall composite shaft element 104.

Figure 3:
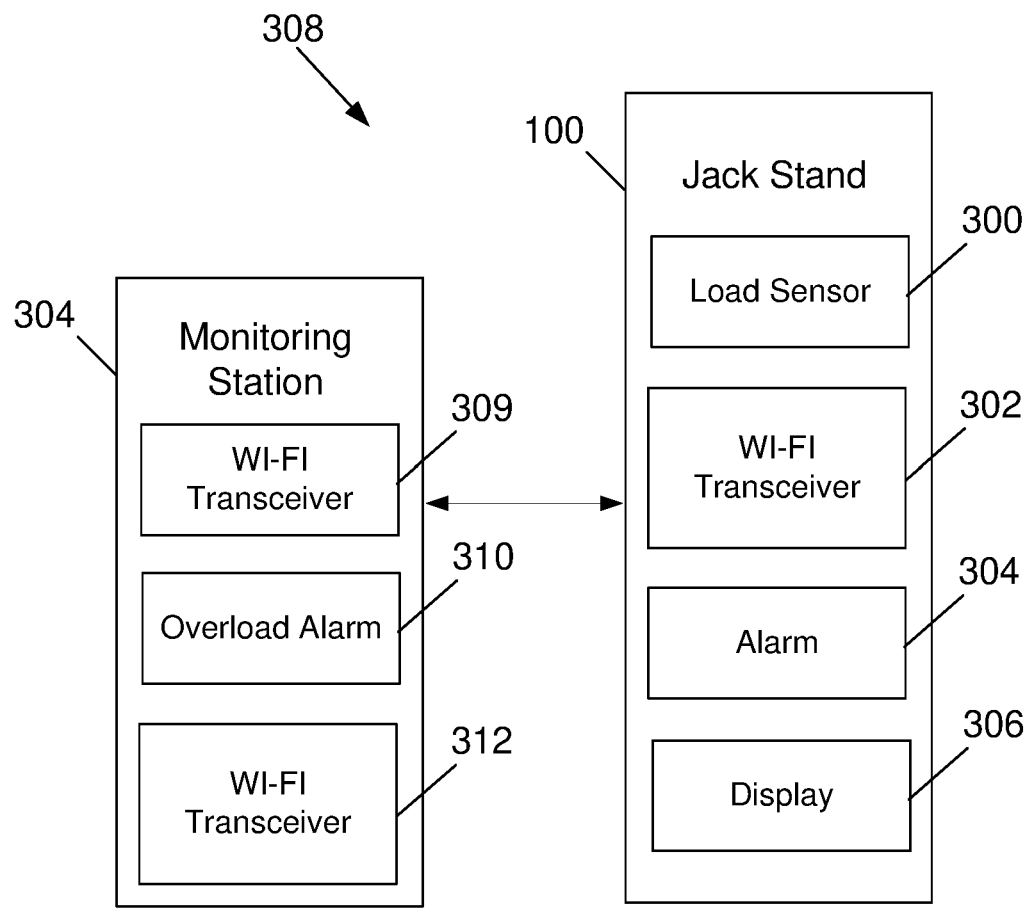
FIG. 3 is an electrical block diagram of the heavy-duty jack stand of FIG. 1.

Turning to FIG. 3, the jack stand 100 is a smart jack stand 100 with advanced monitoring features.

The jack stand 100 includes a load sensor 300, in the form of a strain gauge or load cell, for sensing the payload supported by the stand 100. The jack stand 100 further includes a wireless WI-FI (or Bluetooth) transmitter 302 for transmitting the sensed load to a monitoring station 304.

An audible overload alarm 304 is provided for sounding when the sensed load exceeds a predetermined threshold. The jack stand 100 further includes a digital display 306 for displaying the sensed load.

In practice, the jack stand 100 forms part of a monitoring system 308 including a plurality of the jack stands 100. The monitoring station 308 includes a receiver 309 for receiving the sensed loads from the jack stands 100. The monitoring station 304 includes an overload alarm 310 for being triggered when one of the sensed loads is indicative of a jack stand being overloaded. The monitoring station 304 further includes a logger 312 for logging the sensed loads over time for fleet management. The monitoring system 308 identifies improper use, by load tracking of the jack stands 100, providing traceability for safety purposes and fault tracing should an accident. The monitoring system 308 also provides other useful analysis of loads and efficiencies for business improvement.

A person skilled in the art will appreciate that many embodiments and variations can be made without departing from the ambit of the present invention.

In compliance with the statute, the invention has been described in language more or less specific to structural or methodical features. It is to be understood that the invention is not limited to specific features shown or described since the means herein described comprises preferred forms of putting the invention into effect.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

The claims defining the invention are as follows:

1. A jack stand including:
   a base;
   a post for extending from the base; and
   a top for topping the post and engaging with a load, the top including a load spreader for spreading the weight of the load to the post, wherein
   the load spreader includes a load engaging area and a load spreading area, the load engaging area being smaller in surface area than the load spreading area; and
   the load spreader includes spaced apart feet, the feet including engagement formations for engaging with a cap mounted on the top.

2. A jack stand as claim in claim 1, wherein the top further includes a receptacle for receiving the post and supporting the load spreader.

3. A jack stand as claim in claim 2, wherein the receptacle includes the cap for capping the post.

4. A jack stand as claim in claim 3, wherein the cap defines distributed engagement formations to facilitate engagement with the load spreader.

5. A jack stand as claim in claim 1, wherein each foot include a horizontal plate.

6. A jack stand as claim in claim 1, wherein the load spreader further includes a head for engaging with the load.

7. A jack stand as claim in claim 6, wherein the load spreader further includes a body extending between the feet and the head.

8. A jack stand as claim in claim 7, wherein the body includes one or more plates which are upright.

9. A jack stand as claim in claim 1, rated up to 50 tonne, 75 tonne, 100 tonne, 150 tonne, 200 tonne or 400 tonne; and being lightweight, weighing between about 30 kg and 705 kg.

10. A jack stand as claim in claim 1, wherein the base is wider than the post to provide stability and to distribute the weight of the load.

11. A jack stand as claim in claim 1, wherein the base defines a receptacle for receiving the post, the receptacle forming a complementary fit with the post.

12. A jack stand as claim in claim 11, wherein the base includes a plate from which the receptacle extends, the base further including one or more strengthening fillets extending between the receptacle and the plate.

13. A jack stand as claim in claim 1, wherein the post and/or parts of the load spreader including composite material, the composite material including polymeric resin material and high strength fibres.

14. A jack stand as claim in claim 13, wherein the fibres includes glass fibre, carbon fibre, and aramid (Kevlar) fibre or other like high tensile composite re-inforcing fibre material.

15. A jack stand as claim in claim 13, wherein the composite material includes a matting to align fibers in orientations other than longitudinally along the post to improve compressive strength, the composite material being formed via a pultrusion process and including reinforcing fibres wound around the post to improve compressive strength, the reinforcing fibres separately wound in both clock-wise and anticlockwise directions along the post to further improve compressive strength.

16. A jack stand as claim in claim 1, wherein the base, top, cap and/or load spreader include metal material.

17. A jack stand as claim in claim 1, the post being tubular and the jack stand including a handle fastened to the post.

18. A load spreader for a jack stand, the jack stand including a base and a post for extending from the base, the load spreader forming at least part of a top for topping the post and engaging with a load, the load spreader spreading the weight of the load to the post, wherein the load spreader includes a load engaging area and a load spreading area, the load engaging area being smaller in surface area than the load spreading area, and the load spreader includes spaced apart feet, the feet including engagement formations for engaging with a cap mounted on the top.

* * * * *